United States Patent [19]

Griffis

[11] Patent Number: 4,786,296
[45] Date of Patent: Nov. 22, 1988

[54] APPARATUS FOR USE IN ASBESTOS REMOVAL

[76] Inventor: Steven C. Griffis, 2929 Avenue D, Council Bluffs, Iowa 51501

[21] Appl. No.: 65,871

[22] Filed: Jun. 23, 1987

[51] Int. Cl.$^4$ ................. B01D 45/06; B01D 47/02
[52] U.S. Cl. .................................. 55/248; 55/259; 55/439
[58] Field of Search ............ 55/220, 240, 248, 257 R, 55/259, 429, 437–439, 468; 472/DIG. 3

[56] References Cited

U.S. PATENT DOCUMENTS

| | | | |
|---|---|---|---|
| 1,157,131 | 10/1915 | Sutton | 55/429 X |
| 1,243,472 | 10/1917 | Wilson | 55/259 X |
| 2,051,924 | 8/1936 | Watzke | 55/439 X |
| 2,511,118 | 6/1950 | Matheson | 55/438 X |
| 2,789,659 | 4/1957 | Hemscheidt | 55/323 |
| 3,490,208 | 1/1970 | Meyer et al. | 55/429 X |
| 3,906,733 | 9/1975 | Koppers | 55/220 X |
| 4,298,367 | 11/1981 | Descolas | 55/240 X |
| 4,320,555 | 3/1982 | Watson | 55/220 X |
| 4,604,111 | 8/1986 | Natale | 55/97 |
| 4,640,697 | 2/1987 | Erickson, Jr. | 55/248 |

FOREIGN PATENT DOCUMENTS

| | | | |
|---|---|---|---|
| 137699 | 4/1985 | European Pat. Off. | 55/220 |
| 1170885 | 5/1964 | Fed. Rep. of Germany | 55/468 |
| 2615180 | 10/1977 | Fed. Rep. of Germany | 55/259 |
| 648201 | 2/1979 | U.S.S.R. | 55/468 |

OTHER PUBLICATIONS

Technical Report R883, Civil Engineering Laboratory, Naval Construction Battalion Center, 2/1981, pp. 7-1 through 7-15.
EPA-600/2-80-088, 5/1980, Evaluation of a Commercial Vacuum System for the Removal of Asbstos, pp. 1-74.
EPA-450/2-78-014, 3/1978, Asbestos Containing Material in School Buildings, A Guidance Document, Part 2, pp. I-1-1 through K-1.
Nilfisk GS82, a two-page brochure from Nilfisk of America, Inc.
Nilfisk Simplifies the Safe Collection & Disposal of Toxic, Hazardous, and Nuisance Waste Materials, a six-page brochure from Nilfisk of America, Inc.

Primary Examiner—Robert H. Spitzer
Attorney, Agent, or Firm—Zarley, McKee, Thomte, Voorhees & Sease

[57] ABSTRACT

An apparatus is described for use in asbestos removal from an enclosed space. An air inlet is formed in one of the walls of the enclosed space to permit outside air to enter the same. A filtration unit is positioned in the enclosed space and has an air inlet adapted to draw air into the filtration unit. The filtration unit has an air outlet which is in communication with the space outside of the enclosed space. A flexible conduit is connected to the air intake of the filtration unit and is in communication with the outlet end of a cylindrical trap. A flexible conduit extends from the intake end of the cylindrical trap to a collector pan which is positioned adjacent the location where the asbestos material is being removed from within the enclosed space. When the filtration unit is activated, air and the asbestos fibers are drawn into the collector pan and are delivered to the trap with the asbestos fibers being at least partially trapped by water within the cylindrical trap. The air passes from the cylindrical trap to the air filtration unit with the filtered air being delivered to the area outside of the enclosed area.

2 Claims, 2 Drawing Sheets

APPARATUS FOR USE IN ASBESTOS REMOVAL

BACKGROUND OF THE INVENTION

In the early 1940's, asbestos was an inexpensive material which was used in virtually every industrial plant across the nation because of its superior capabilities of noise reduction, insulating and fire retardant qualities. Asbestos was used in cement asbestos pipe, plaster, wiring, pipe insulation, sound absorbing tiles, floor tiles and sprayed on ceiling structural steel and deck pans.

Asbestos has been found to be a health hazard and asbestos removal or abatement programs are being conducted to remove these health hazards. Many regulations have been adopted and are in place to ensure the safety of those workers who are removing the asbestos as well as to ensure that the asbestos being removed will not be introduced into the surrounding atmosphere. For example, U.S. Pat. No. 4,604,111 describes a fairly common system which is employed in an asbestos removal project. In most projects, an enclosure is created around the space in which the asbestos is to be removed. The space is sealed by means of plastic sheets or the like. An air inlet is provided for the enclosed space to permit air to be drawn thereinto. A filtration unit such as the Model MT-3 of Micro-Trap, Inc. of Maple Shade, N.J. or the Model ST2000 of Global Consumer Services, Inc. of Los Angeles, Calif. is employed with each of the units having an air inlet and an air outlet. The air outlet of the filtration unit is placed in communication with the area outside of the enclosed space. A blower means is provided in the filtration unit so that the contaminated air in the enclosed space will be drawn through the filtration unit with the asbestos fibers being collected in the filtration unit. The filtration units are sometimes referred to as negative air systems so that air is drawn through the air inlet formed in the wall means and through the filtration unit.

A problem exists in such systems in that a worker removing the asbestos may be located some distance from the air intake of the filtration unit and will be working in a particular area which is highly contaminated with the asbestos fibers. Yet another disadvantage of the prior art systems is that the filters in the filtration units become quickly clogged and therefore require removal and disposal.

It is therefore a principal object of the invention to provide an improved system for asbestos removal.

Yet another object of the invention is to provide a system for use in asbestos removal projects wherein a movable collector pan is positioned adjacent the area in which the asbestos is being removed with the collector pan being in operative communication with a trap which is in communication with the air inlet of the filtration unit.

Yet another object of the invention is to provide a means for extending the life of the filters in the filtration units by trapping a portion of the airborne fibers before they can reach the filtration unit.

These and other objects will be apparent to those skilled in the art.

SUMMARY OF THE INVENTION

The area in which the asbestos is to be removed is first enclosed by either using the existing walls of the structure or by creating temporary walls. The walls are sealed to prevent the asbestos fibers from being discharged from the enclosed space. A filtration unit is positioned in the enclosed space and has an air inlet adapted to draw air into the filtration unit. The filtration unit has an air outlet which communicates with the space outside of the enclosed space. A flexible conduit is connected to the air intake of the filtration unit and is in communication with a cylindrical trap. A flexible conduit extends from the cylindrical trap and has a movable collector pan connected to the end thereof. When the filtration unit is operated, airborne asbestos fibers in the vicinity of the collector pan are drawn thereinto and are delivered to the cylindrical trap where a large portion of the fibers are collected in water within the trap. The air is drawn outwardly from the trap and into the intake of the filtration unit.

DESCRIPTION OF THE PREFERRED EMBODIMENT

Figure 1:
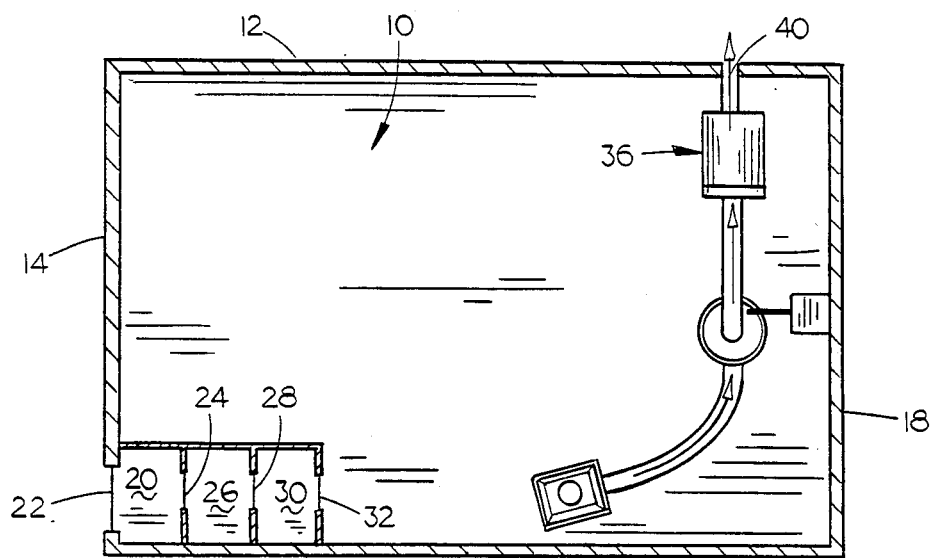
FIG. 1 is a floor plan illustrating the use of the apparatus of this invention.

In FIG. 1, the numeral 10 refers generally to an enclosed space from which the asbestos is to be removed. Enclosed space 10 is either defined by the walls of the building structure or by temporary walls. In either case, the walls are referred to generally by the reference numerals 12, 14, 16 and 18. The walls would normally be sealed with a plastic sheeting material to prevent the escape of fibers therefrom. In most projects, a clean room 20 is provided having an entrance 22. Door 24 connects clean room 20 with shower room 26. Door 28 connects shower room 26 with equipment room 30. Door 32 connects equipment room 30 with the enclosed space 10. Doors 24, 28 and 32 are normally comprised of a flexible plastic material which may be pushed aside when passing therethrough.

The numeral 36 refers to a conventional filtration unit such as that previously described. Filtration unit 36 includes an air outlet 38 which communicates with an opening 40 in wall 12 so that air being discharged from the filtration unit 36 will be discharged outwardly of the space 10. Filtration unit 36 also includes an air inlet 42. The structure described to this point is conventional. In the typical situation, the workmen could be working in any area within the space 10 and the removal of the asbestos in the space 10 would cause asbestos fibers to be airborne. The prior system is intended to eventually draw the asbestos fibers into the air intake 42 of the filter.

Figure 2:
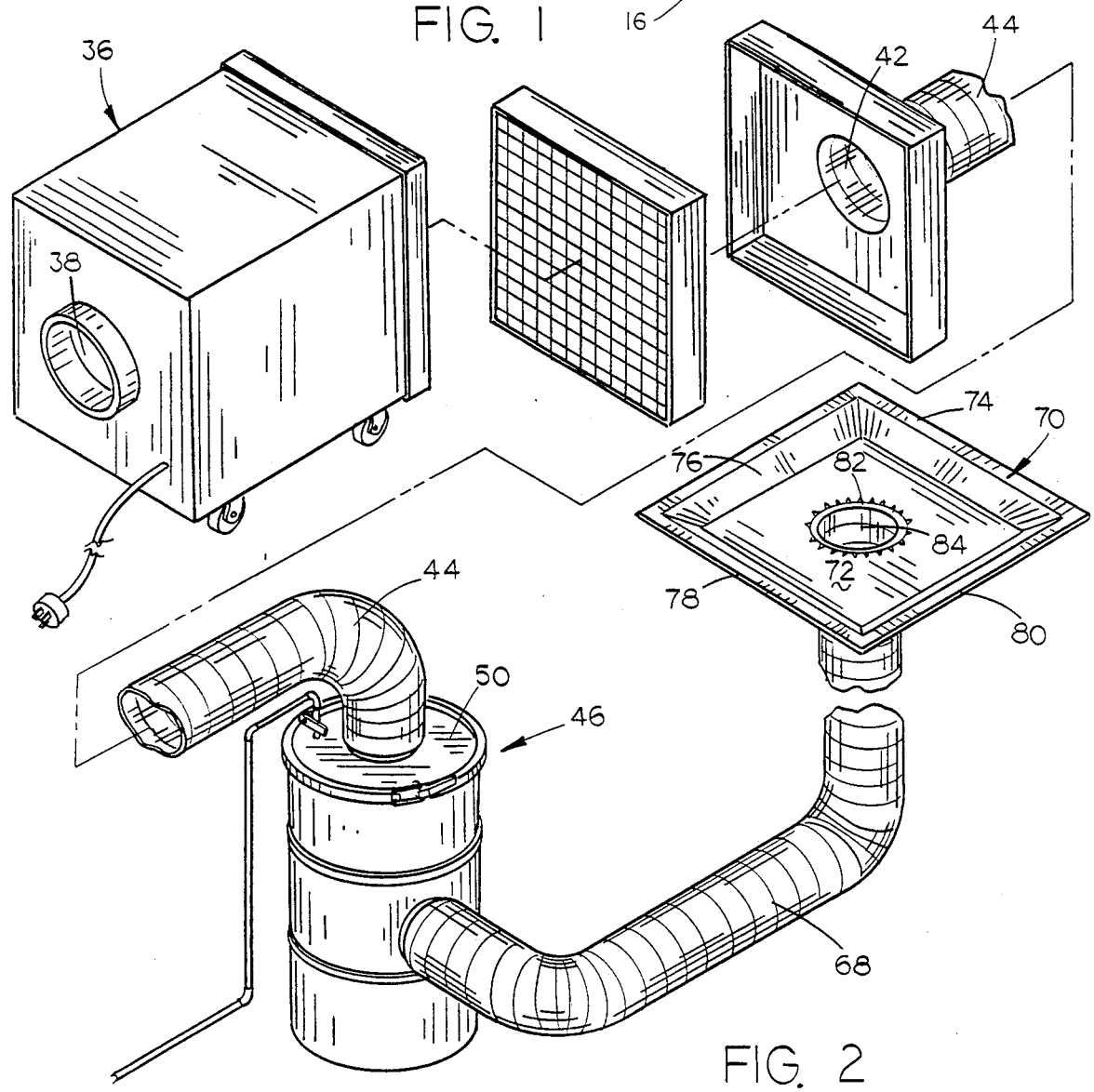
FIG. 2 is an exploded perspective view of the apparatus of this invention.
Figure 3:
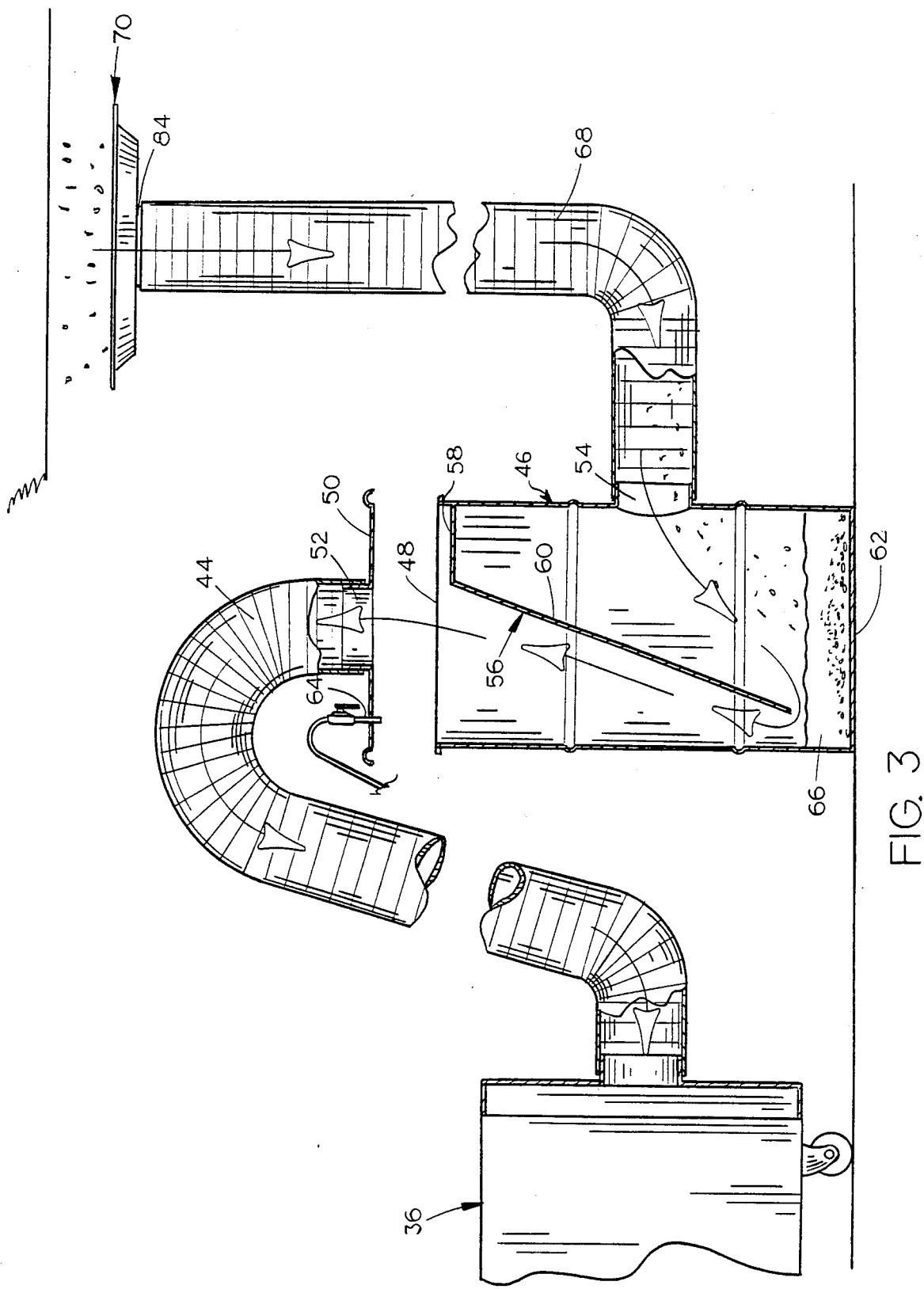
FIG. 3 is a side view of the apparatus of this invention with portions thereof cut away to more fully illustrate the invention.

In this invention, a flexible conduit 44 is connected to the air inlet 42 and extends therefrom. The numeral 46 refers to a cylindrical trap or filter which is best illustrated in FIGS. 2 and 3. Trap 46 is provided with an open upper end 48 which may be closed by means of cover 50. Cover 50 has an air outlet 52 provided thereon which is connected to the flexible conduit 44. Trap 46 is also provided with an air inlet 54 which is in communication with the interior thereof as seen in FIG. 3. A baffle or deflector 56 is provided within trap 46 and includes a top portion 58 having a wall portion 60 extending downwardly from the inner end thereof between the sides of the trap. As seen in FIG. 3, the lower end of wall 60 terminates above the lower end 62 of trap 46. Cover 50 is provided with a water connection 64 which is connected to a source of water so that a predetermined amount of water may be introduced into the trap 46. The water is referred to generally by the reference numeral 66 in FIG. 3.

Flexible conduit 68 is connected to air inlet 54 and extends therefrom as seen in the drawings. Collector pan 70 is operatively connected to the end of flexible conduit 68. Pan 70 may be of circular or rectangular configuration although the rectangular configuration is the preferred embodiment. Pan 70 includes a bottom 72 having side walls 74, 76, 78 and 80 extending upwardly and outwardly therefrom. Bottom 72 is provided with an opening 82 having a sleeve 84 mounted therein to which conduit 68 is connected.

In operation, the filtration unit 36 will be operated to create a negative air pressure within space 10. Actuation of filtration unit 36 will cause air to be drawn through opening 82 in collector pan 70, conduit 68, trap 46, conduit 44 and through the filtration unit 36. The collector pan 70 is positioned in close proximity to the location, in the space 10, where the asbestos is being removed. Thus, asbestos fibers which are airborne in the vicinity of the actual removal location will fall into and will be drawn into the collector pan 70 and into the conduit 68. The air and fibers entering the trap 46 will strike the wall 60 so that the asbestos fibers will be deflected downwardly into the water 66 with a great deal of the fibers being trapped or collected in the water 66. The air passes around the bottom of the side wall 60 and then is pulled from the trap 46 through the outlet 52 and to the filtration unit 36. The air passing through the trap 46 will cause a certain amount of the water in the trap to evaporate so water is introduced into the trap 46 as desired through the connection 64.

The system is operated until the water within the trap 46 becomes much like a sludge due to the asbestos material being trapped therein. When that condition occurs, the sludge is removed from the trap 46. It has been found that the system of this invention draws the airborne asbestos fibers away from the worker much more efficiently than the prior art systems. It has also been found that by trapping a certain amount of the asbestos fibers in the trap 46, the life of the filters in the filtration unit 36 is greatly extended.

Thus it can be seen that the invention accomplishes at least all of its stated objectives.

I claim:

1. A system for removing dangerous solid materials from an enclosed area within a building, said system comprising: wall means defining said enclosed area;
    said enclosed area having at least one air inlet formed therein to permit air to enter said enclosed area;
    said wall means having at least one air outlet formed therein to permit air to exit said enclosed area;
    a negative air filtration means located within said enclosed area;
    said filtration means having an air inlet and an air outlet;
    said air outlet of said filtration means being in communication with the air outlet in said wall means;
    a trap means in said enclosed area having an inlet end and an outlet end and a baffle means therebetween;
    a predetermined amount of collection fluid in the bottom of said trap means;
    said trap means comprising an upstanding cylinder having upper and lower ends, said air outlet end being formed in the upper end of said cylindrical member, said air inlet end being formed in the side wall of said cylindrical member, said baffle means extending downwardly and laterally from the upper end of said cylindrical member between said air inlet end and said air outlet end and terminating at a point above the lower end of said cylindrical member, for directing solid materials into the collection fluid;
    said trap means further including means for supplying collection fluid to the interior of said trap means;
    a first flexible conduit connecting said outlet end of said trap means with the air inlet of said filtration means;
    a second flexible conduit connected to the air inlet end of said trap means and extending therefrom;
    a collector means at the other end of said second conduit means;
    said collector means comprising a collector pan means;
    and means for drawing air through said collector means, through said second conduit means, through said trap means, thence through said first conduit means and thence into said filtration means whereby airborne solid materials in the vicinity of said collector pan will be drawn thereinto and into said trap means for at least partial collection in the water in said trap means.

2. A system for removing dangerous solid materials from an enclosed area within a building, said system comprising: wall means defining said enclosed area;
    said enclosed area having at least one air inlet formed therein to permit air to enter said enclosed area;
    a negative air filtration means having an air inlet end and an air outlet end;
    the air inlet end of said filtration means being in operative communication with said enclosed area;
    the air outlet end of said filtration means being in operative communication with the area outside of said enclosed area;
    a trap means in said enclosed area having an inlet end and an outlet end and a baffle means therebetween;
    a predetermined amount of collection fluid in the bottom of said trap means;
    a first conduit means connecting the outlet end of said trap means with the air inlet of said filtration means;
    a second conduit means connected to the air inlet end of said trap means and extending therefrom;
    said trap means comprising an upstanding cylinder having upper and lower ends, said air outlet end being formed in the upper end of said cylindrical member, said air inlet end being formed in the side wall of said cylindrical member, said baffle means extending downwardly and laterally from the upper end of said cylindrical member between said air inlet end and said air outlet end and terminating in a point above the lower end of said cylindrical member for directing solid materials into said collection fluid;
    said trap means further including means for supplying collection fluid to the interior of said trap means;
    a collector means at the other end of said second conduit means;
    said collector means comprising a collector pan means;
    and means for drawing air through said collector means, through said second conduit means, through said trap means, thence through said first conduit means and thence into said filtration means whereby airborne solid materials in the vicinity of said collector means will be drawn thereinto and into said trap means for at least partial collection in the water in said trap means.

* * * * *